United States Patent
Popescu et al.

(10) Patent No.: US 9,083,237 B2
(45) Date of Patent: Jul. 14, 2015

(54) CIRCUITS AND METHODS FOR CONTROLLING A DC/DC CONVERTER

(75) Inventors: Serban Mihai Popescu, San Carlos, CA (US); Laszlo Lipcsei, Campbell, CA (US); Marius Padure, Bucharest (RO); Guoyong Guo, San Jose, CA (US)

(73) Assignee: O2Micro, Inc., Santa Clara, CA (US)

( * ) Notice: Subject to any disclaimer, the term of this patent is extended or adjusted under 35 U.S.C. 154(b) by 954 days.

(21) Appl. No.: 13/166,603

(22) Filed: Jun. 22, 2011

(65) Prior Publication Data
US 2012/0013315 A1   Jan. 19, 2012

Related U.S. Application Data

(60) Provisional application No. 61/363,885, filed on Jul. 13, 2010.

(51) Int. Cl.
*G05F 1/00* (2006.01)
*H02M 3/156* (2006.01)
*H02M 1/32* (2007.01)
*H02M 1/00* (2007.01)

(52) U.S. Cl.
CPC ............. *H02M 3/156* (2013.01); *H02M 1/32* (2013.01); *H02M 2001/0025* (2013.01); *H02M 2001/0029* (2013.01); *H02M 2001/0032* (2013.01); *Y02B 70/16* (2013.01)

(58) Field of Classification Search
USPC ................................ 323/282, 284, 285, 288
See application file for complete search history.

(56) References Cited

U.S. PATENT DOCUMENTS

| 5,084,666 | A | 1/1992 | Bolash |
| 5,919,262 | A | 7/1999 | Kikinis et al. |
| 6,366,114 | B1 * | 4/2002 | Liu et al. .................... 326/27 |
| 7,595,624 | B2 * | 9/2009 | Tateishi et al. ............. 323/288 |
| 7,714,562 | B2 | 5/2010 | Oswald et al. |
| 7,746,042 | B2 | 6/2010 | Williams et al. |
| 8,004,263 | B2 | 8/2011 | Hirata et al. |
| 2004/0135567 | A1 | 7/2004 | Fukui |
| 2005/0088212 | A1 | 4/2005 | Leith et al. |

FOREIGN PATENT DOCUMENTS

| JP | S63305755 A | 12/1988 |
| JP | 2002315311 A | 10/2002 |
| JP | 2007159395 A | 6/2007 |
| JP | 2008104285 A | 5/2008 |
| JP | 2010011576 A | 1/2010 |
| JP | 2010506552 A | 2/2010 |
| TW | M374091 U1 | 2/2010 |

\* cited by examiner

*Primary Examiner* — Adolf Berhane
*Assistant Examiner* — Afework Demisse

(57) ABSTRACT

A converter circuit includes a converter and a controller. The converter converts an input voltage to an output voltage. The controller receives a reference voltage, generates a slew voltage having a substantially constant first slew rate if the reference voltage changes from a first level to a second level, and controls the converter based on the slew voltage to cause the output voltage to change from a third level to a fourth level at a substantially constant second slew rate.

22 Claims, 5 Drawing Sheets

US 9,083,237 B2

CIRCUITS AND METHODS FOR CONTROLLING A DC/DC CONVERTER

RELATED APPLICATION

This application claims priority to U.S. Provisional Application No. 61/363,885, titled "Circuits and Methods for Controlling a DC/DC Converter" filed on Jul. 13, 2010, which is hereby incorporated by reference in its entirety.

BACKGROUND

Direct current (DC) to DC converters are widely used in electronic devices such as cellular phones and laptop computers, which are supplied with DC power, e.g., from batteries. Such electronic devices typically contain multiple sub-circuits, each of which is powered by a driving voltage different from the battery voltage. Additionally, some sub-circuits need different driving voltages in order to work in different operation modes. Take a central processing unit (CPU) in a sub-circuit, for example: a driving voltage for the CPU when the CPU is executing an instruction is higher than that when the CPU is idle.

The DC to DC converter is capable of converting the battery voltage to a regulated DC voltage which is suitable for driving a particular sub-circuit. FIG. 1 illustrates a block diagram of a conventional converter circuit 100. The converter circuit 100 includes a battery pack 110, a buck converter 120, and a controller 130. The battery pack 110 provides an input voltage $V_{IN}$. The buck converter 120 includes switches 122 and 124, an inductor 126, and a capacitor 128, and is operable for converting the input voltage $V_{IN}$ to an output voltage $V_{OUT}$. The controller 130 includes a regulator 132 for receiving a reference voltage $V_{SET}$ indicative of a desired voltage $V_{DSR\_1}$, e.g., $V_{DSR\_1}$ is suitable for driving a corresponding sub-circuit 140 coupled to the output of the buck converter 120, and for receiving a feedback signal 146 indicative of the output voltage $V_{OUT}$. By comparing the feedback signal 146 to the reference voltage $V_{SET}$, the regulator 132 provides switch-control signals 142 and 144 to turn on the switches 122 and 124 alternately. Accordingly, the level of the output voltage $V_{OUT}$ is maintained at the desired voltage $V_{DSR\_1}$.

However, when the reference voltage $V_{SET}$ is changed to a new level indicative of a desired voltage $V_{DSR\_2}$, the output voltage $V_{OUT}$ is not changed instantaneously to $V_{DSR\_2}$. Because the reference voltage $V_{SET}$ is different from the output voltage $V_{OUT}$ (e.g., $V_{OUT}$ is still equal to $V_{DSR\_1}$), a protection component 134 in the controller 130 will regard such a situation as an abnormal condition, e.g., an over-voltage or an under-voltage condition. As such, the protection component 134 generates a termination signal 138 indicating the abnormal condition. Accordingly, the regulator 132 controls the switch-control signals 142 and 144 to keep turning off the switch 122 and turning on the switch 124, which will terminate the operation of the buck converter 120.

Alternatively, the controller 130 does not include the protection component 134. In this instance, the controller 130 changes $V_{OUT}$ to $V_{DSR\_2}$ abruptly by adjusting the energy stored in the inductor 126 and the capacitor 128, which causes a sharp increase of a current through the components in the buck converter 120, e.g., the capacitor 128 and the inductor 126. Consequently, such components may be damaged and the lifetime of the converter circuit 100 may be shortened.

SUMMARY

In one embodiment, a converter circuit includes a converter and a controller. The converter converts an input voltage to an output voltage. The controller receives a reference voltage, generates a slew voltage having a substantially constant first slew rate if the reference voltage changes from a first level to a second level, and controls the converter based on the slew voltage to cause the output voltage to change from a third level to a fourth level at a substantially constant second slew rate.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments in accordance with the present disclosure provide a converter circuit. The converter circuit includes a converter and a controller. The converter converts an input voltage to an output voltage. The controller receives a reference voltage indicating a desired level for the output voltage. The controller generates a slew voltage having a substantially constant first slew rate if the reference voltage changes from a first level to a second level. The controller controls the converter according to the slew voltage to change the output voltage from a first desired level to a second desired level at a substantially constant second constant slew rate.

Advantageously, the output voltage can change from the first desired level to the second desired level gradually rather than abruptly. As a result, the currents through the components of the converter are maintained in a safe range, which improves the performance of the converter circuit and lengthens the lifetime of the converter circuit.

Figure 1:
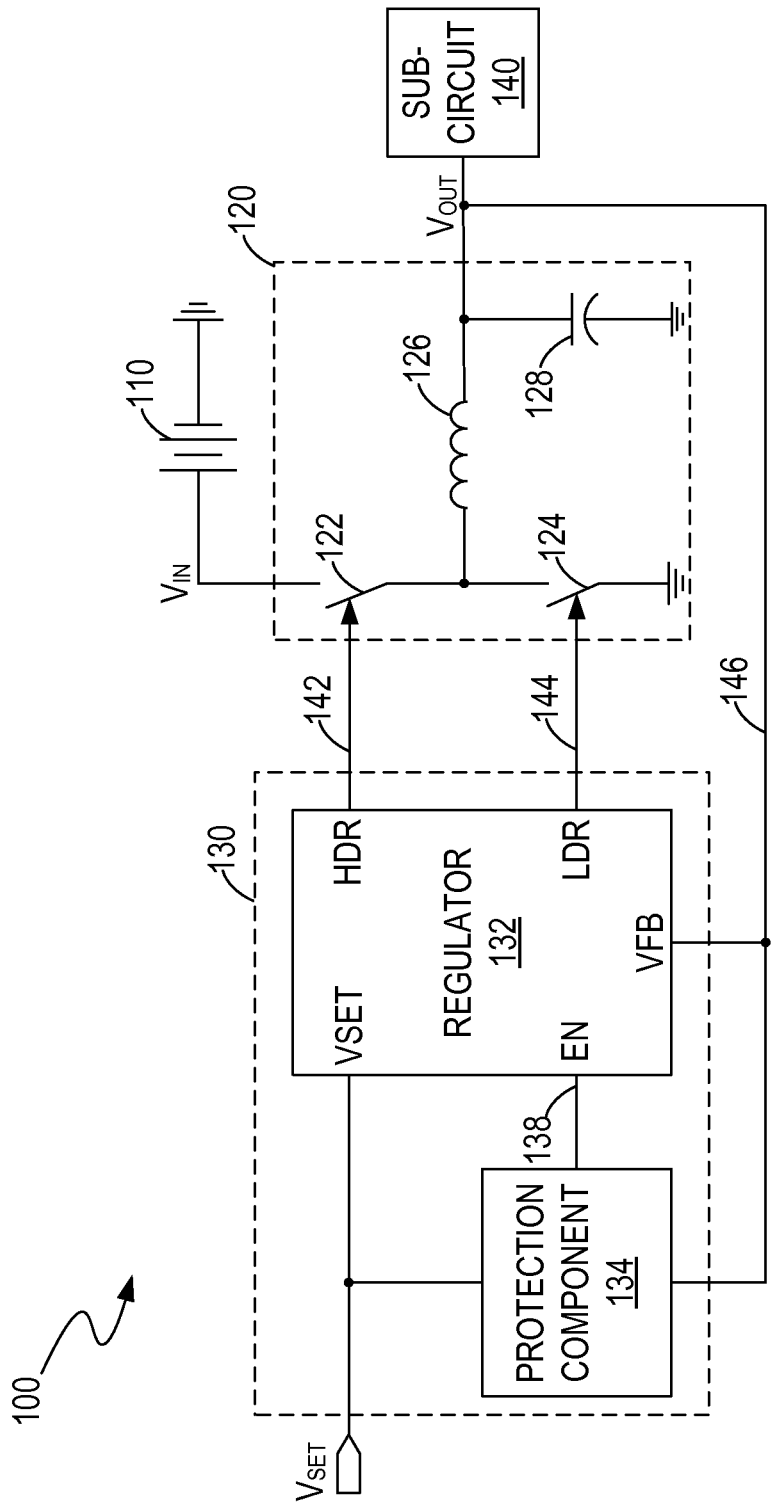
FIG. 1 illustrates a block diagram of a conventional converter circuit.
Figure 2:
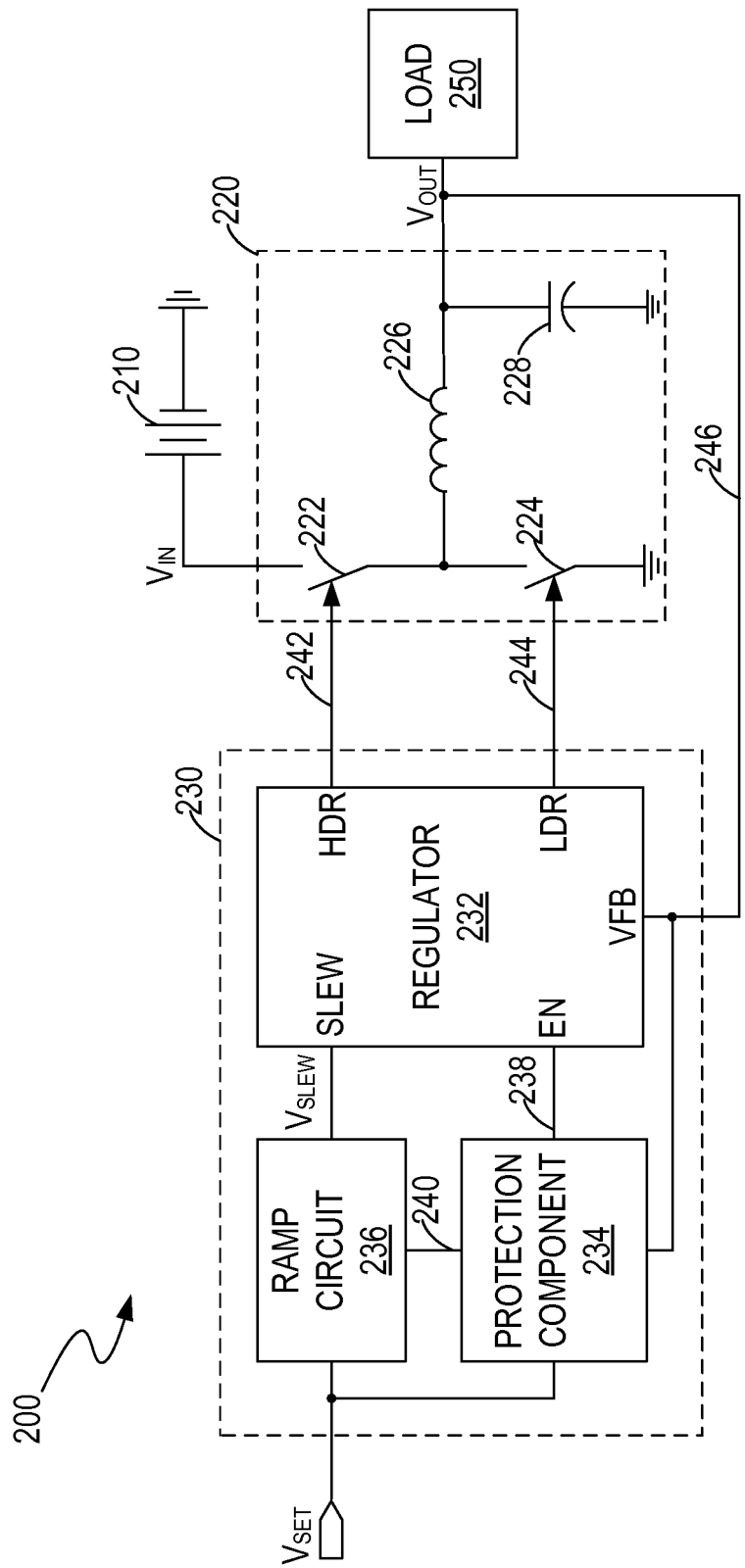
FIG. 2 illustrates a block diagram of a converter circuit, in accordance with one embodiment of the present invention.

FIG. 2 illustrates a block diagram of a converter circuit 200, in accordance with one embodiment of the present invention. The converter circuit 200 includes a power source 210, a converter 220, a controller 230, and a load 250. The power source 210 can be a battery pack that generates an input voltage $V_{IN}$. The converter 220 converts the input voltage $V_{IN}$ to an output voltage $V_{OUT}$. In one embodiment, the output voltage $V_{OUT}$ has a voltage level different from the input voltage $V_{IN}$, and is used to power the load 250, e.g., a sub-circuit in a computer system. The controller 230 is operable for generating a pair of switch-control signals 242 and 244 to control the converter 220. For example, the converter 220 adjusts the output voltage $V_{OUT}$ according to the switch-control signals 242 and 244.

In the example of FIG. 2, the converter 220 can be a buck converter including a pair of switches 222 and 224, an inductor 226, and a capacitor 228. The switches 222 and 224 are coupled in series between the battery pack 210 and ground. The inductor 226 is coupled between a common node of the switches 222 and 224 and the capacitor 228. In operation, the switch-control signals 242 and 244 are complementary pulse-width modulation (PWM) signals, in one embodiment. The switches 222 and 224 receive the switch-control signals 242 and 244, respectively, and alternately operate in an ON state (e.g., the switch 222 is turned on and the switch 224 is turned off) and an OFF state (e.g., the switch 222 is turned off and the switch 224 is turned on). Thus, energy stored in the inductor 226 and the capacitor 228 is adjusted according to a ratio of a time duration $T_{ON}$ of the ON state to a time duration $T_{OFF}$ of the OFF state. Therefore, the output voltage $V_{OUT}$ is adjustable according to the ratio of $T_{ON}$ to $T_{OFF}$, which can be given by:

$$V_{OUT}=V_{IN}*[T_{ON}/(T_{ON}+T_{OFF})]=V_{IN}*[1/(1+T_{OFF}/T_{ON})]. \quad (1)$$

The converter 220 can have other configurations, such as a boost converter, a boost-buck converter, a flyback converter, or a linear regulator, and is not limited to the example of FIG. 2.

The controller 230 includes a regulator 232 and a ramp circuit 236. The ramp circuit 236 receives a reference voltage $V_{SET}$ indicative of a desired level $V_{DESIRE}$ for the output voltage $V_{OUT}$. For example, a user can predetermine/program the reference voltage $V_{SET}$ according to a requirement of the load 250 powered by the output voltage $V_{OUT}$. In one embodiment, the load 250 demands different driving voltages, such as a desired level $V_{DESIRE1}$ and a desired level $V_{DESIRE2}$, to work in different operation modes. By way of example, the load 250 can be a central processing unit (CPU) in a computer system. When the CPU is in a first operation mode, e.g., an idle mode, the reference voltage $V_{SET}$ has a first voltage level $V_{SET1}$ to set the output voltage $V_{OUT}$ to the desired level $V_{DESIRE1}$. When the CPU is switched to a second operation mode (e.g., to execute an instruction), the reference voltage $V_{SET}$ is changed to a second voltage level $V_{SET2}$ to set the output voltage $V_{OUT}$ to the desired level $V_{DESIRE2}$. In other words, the reference voltage $V_{SET}$ changes from the first voltage level $V_{SET1}$ to the second voltage level $V_{SET2}$ to change the output voltage $V_{OUT}$ from $V_{DESIRE1}$ to $V_{DESIRE2}$.

The ramp circuit 236 is operable for providing a slew voltage $V_{SLEW}$ having a substantially constant first slew rate according to the reference voltage $V_{SET}$. As used in the present disclosure, the term "slew rate" represents a rate of change (not necessarily the maximum rate of change) of a particular signal such as a voltage change rate or a current change rate. As used herein, the term "substantially constant slew rate" is used to mean that some change in the slew rate is permissible, as long as that change is small enough so that currents in the converter 220 remain within a specified safe range. More specifically, in one embodiment, the slew voltage $V_{SLEW}$ is equal to a level $V_{SLEW1}$ when the reference voltage $V_{SET}$ is equal to the first voltage level $V_{SET1}$. If $V_{SET}$ changes from $V_{SET1}$ to $V_{SET2}$, the slew voltage $V_{SLEW}$ ramps from the level $V_{SLEW1}$ to a level $V_{SLEW2}$ at the first slew rate. In one embodiment, the level $V_{SLEW1}$ is proportional to the level $V_{SET1}$ and the level $V_{SLEW2}$ is proportional to the level $V_{SET2}$. For example, $V_{SLEW1}=V_{SET1}$ and $V_{SLEW2}=V_{SET2}$ if the proportional rate is one. The operation of the reference voltage $V_{SET}$ and the slew voltage $V_{SLEW}$ are further described in relation to FIG. 3 and FIG. 4.

The regulator 232 receives the slew voltage $V_{SLEW}$, and controls the converter 220 accordingly to adjust the output voltage $V_{OUT}$. In one embodiment, the regulator 232 includes a VFB pin for receiving a feedback signal 246 indicative of the output voltage $V_{OUT}$ and a SLEW pin for receiving the slew voltage $V_{SLEW}$. The regulator 232 compares the feedback signal 246 with the slew voltage $V_{SLEW}$, and generates the switch-control signals 242 and 244 to adjust the output voltage $V_{OUT}$ according to a result of the comparison. For example, if the feedback signal 246 is greater than the slew voltage $V_{SLEW}$, the regulator 232 decreases a ratio of $T_{ON}$ to $T_{OFF}$. As such, the output voltage $V_{OUT}$ is decreased according to equation (1). Likewise, if the feedback signal 246 is less than the slew voltage $V_{SLEW}$, the regulator 232 increases the ratio of $T_{ON}$ to $T_{OFF}$ to increase the output voltage $V_{OUT}$. Consequently, a waveform of the output voltage $V_{OUT}$ follows a waveform of the slew voltage $V_{SLEW}$. As the slew voltage $V_{SLEW}$ has a substantially constant first slew rate, the output voltage $V_{OUT}$ has a substantially constant second slew rate. In one embodiment, the constant first slew rate is proportional to the constant second slew rate. For example, the substantially constant first slew rate is equal to the substantially constant second slew rate if the proportional rate is one.

Advantageously, when the reference voltage $V_{SET}$ steps from $V_{SET1}$ to $V_{SET2}$, the controller 230 does not change the output voltage $V_{OUT}$ from $V_{DESIRE1}$ to $V_{DESIRE2}$ abruptly. Instead, the output voltage $V_{OUT}$ follows the slew voltage $V_{SLEW}$ (having the constant first slew rate) and gradually changes from $V_{DESIRE1}$ to $V_{DESIRE2}$ at the constant second slew rate. For example, the voltage of the feedback signal 246 can be proportional to the output voltage $V_{OUT}$. Thus, the regulator 232 adjusts the output voltage $V_{OUT}$ to be equal to an amount proportional to $V_{SLEW}$. In this instance, the constant first slew rate is proportional to the constant second slew rate. In this circumstance, the currents flowing through the components of the converter 220, e.g., the inductor 226 and the capacitor 228, are maintained within a safe range, which improves the security performance of the converter circuit 200 and lengthens the lifetime of the converter circuit 200.

In one embodiment, the controller 230 further includes a protection component 234 to protect the converter circuit 200 from an abnormal condition such as an over-voltage condition or an under-voltage condition. More specifically, the protection component 234 monitors the abnormal condition by detecting the reference voltage $V_{SET}$ indicative of the desired voltage $V_{DESIRE}$ and also detecting the feedback signal 246 indicating the output voltage $V_{OUT}$. If $V_{OUT}$ is greater than $V_{DESIRE}$ and a difference between $V_{OUT}$ and $V_{DESIRE}$, e.g., $V_{OUT}-V_{DESIRE}$, is greater than a predetermined over-voltage threshold, the protection component 234 indicates an over-voltage condition. Likewise, if $V_{OUT}$ is less than $V_{DESIRE}$ and a difference between $V_{OUT}$ and $V_{DESIRE}$, e.g., $V_{DESIRE}-V_{OUT}$, is greater than a predetermined under-voltage threshold, the protection component 234 indicates an under-voltage condition.

Furthermore, the protection component 234 generates a termination signal 238 to terminate operation of the converter 220 when an abnormal condition of the converter circuit 200 is detected. For example, upon receiving the termination signal 238, the regulator 232 controls the switch control signals 242 and 244 to keep the switches 222 and 224 in the OFF state (e.g., the switch 222 is turned off and the switch 224 is turned on), such that the output voltage $V_{OUT}$ drops to zero volts and the operation of the converter 220 is terminated.

The ramp circuit 236 generates a detection signal 240 indicating whether $V_{OUT}$ is ramping from $V_{DESIRE1}$ to $V_{DESIRE2}$ after $V_{SET}$ changes from $V_{SET1}$ to $V_{SET2}$. Advantageously, the protection component 234 is prevented from terminating the operation of the converter 220 according to the detection signal 240. For example, the detection signal 240 can be a digital signal. When the detection signal 240 is digital one, indicating $V_{SLEW}$ is ramping from $V_{SLEW1}$ to $V_{SLEW2}$ after $V_{SET}$ changes from $V_{SET1}$ to $V_{SET2}$, the protection component 234 does not shut down the converter 220 even if a difference between $V_{OUT}$ and $V_{DESIRE}$ is greater than the over-voltage threshold when $V_{OUT}$ is greater than $V_{DESIRE}$, or a difference between $V_{OUT}$ and $V_{DESIRE}$ is greater than the under-voltage threshold when $V_{OUT}$ is less than $V_{DESIRE}$. Therefore, operation of the converter 220 is not terminated as a result of the adjustment of the reference voltage $V_{SET}$, which improves the stability of the converter circuit 200.

Figure 3:
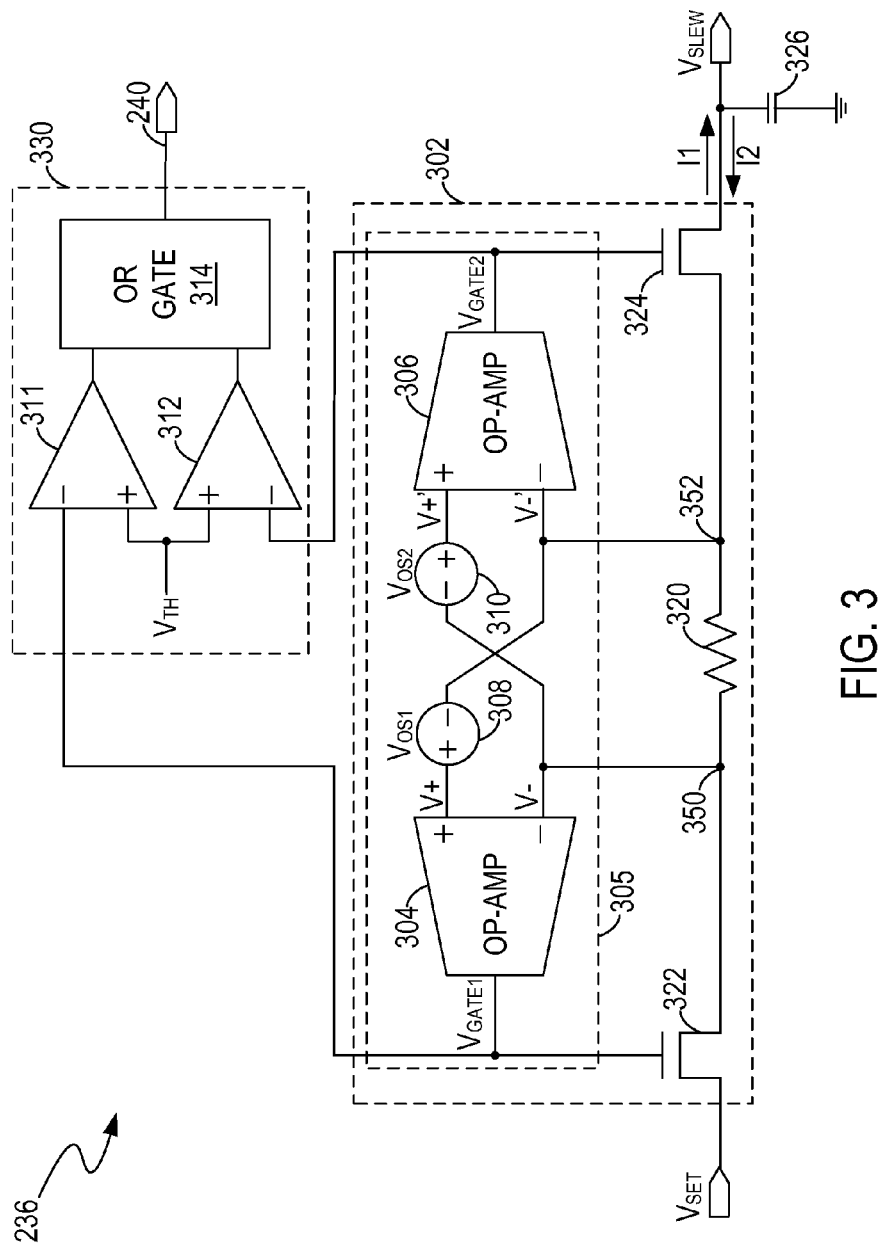
FIG. 3 illustrates a diagram of a ramp circuit, in accordance with one embodiment of the present invention.

FIG. 3 illustrates a diagram of the ramp circuit 236, in accordance with one embodiment of the present invention. Elements labeled the same as in FIG. 2 have similar functions. FIG. 3 is described in combination with FIG. 2. In the embodiment of FIG. 3, the reference voltage $V_{SET}$ is equal to the desired level $V_{DESIRE}$, and $V_{SLEW}$ is equal to $V_{DESIRE}$ for illustrative purposes. However, this invention is not so limited; the reference voltage $V_{SET}$ may be different from the desired level $V_{DESIRE}$, e.g., $V_{SET}$ is proportional to $V_{DESIRE}$ and the proportional rate is not equal to one, in an alternative embodiment. Assuming $V_{SET1} = V_{SLEW1} = V_{DESIRE1} = V1$ and $V_{SET2} = V_{SLEW2} = V_{DESIRE2} = V2$, where $V1 > V2$, the reference voltage $V_{SET}$ can decrease from V1 to V2 to set the output voltage $V_{OUT}$ from V1 to V2, and can also increase from V2 to V1 to set the output voltage $V_{OUT}$ from V2 to V1.

The ramp circuit 236 includes a current generator 302, a capacitor 326, and a detection module 330. The current generator 302 is coupled to the capacitor 326 and is operable for detecting the reference voltage $V_{SET}$ and the slew voltage $V_{SLEW}$, and for generating a substantially constant current I1 or I2 accordingly. As used herein, the term "substantially constant current" is used to mean that some change in the current I1 or I2 is permissible, as long as that change is small enough so that currents in the converter 220 remain within a specified safe range. In one embodiment, the constant current I1 or I2 is conducted through the capacitor 326 to adjust the slew voltage $V_{SLEW}$. More specifically, the current generator 302 compares the reference voltage $V_{SET}$ to the slew voltage $V_{SLEW}$, in one embodiment. If $V_{SET}$ is less than $V_{SLEW}$ after $V_{SET}$ drops from V1 to V2 (V1>V2), the current generator 302 generates the constant current I2 from the capacitor 326 to the current generator 302 to discharge the capacitor 326. As such, the slew voltage $V_{SLEW}$ across the capacitor 326 ramps down until $V_{SLEW}$ is equal to V2, where the change rate, e.g., the first slew rate, is a substantially constant determined by the current I2. If $V_{SET}$ is greater than $V_{SLEW}$ after $V_{SET}$ rises from V2 to V1, the current generator 302 generates the substantially constant current I1 from the current generator 302 to the capacitor 326 to charge the capacitor 326. As such, the slew voltage $V_{SLEW}$ ramps up until reaching V1, where the change rate is also a substantially constant determined by the current I1.

In one embodiment, the current generator 302 includes a control circuit 305, voltage sources 308 and 310, a resistor 320, and transistors 322 and 324. The control circuit 305 includes operational amplifiers (Op-amps) 304 and 306. The transistors 322 and 324 can be, but are not limited to, N type metal-oxide semiconductor (NMOS) field effect transistors. The transistor 322, the resistor 320, and the transistor 324 are coupled in series to constitute a current path L1 for the current I1 or I2. The transistor 322 is coupled to a node that is at the reference voltage $V_{SET}$, and has a gate coupled to an output terminal of the Op-amp 304 and is capable of working in a linear region, an off region, or a saturation region in accordance with a gate-source voltage $V_{GS1}$ (e.g., $V_{GS1} = V_{GATE1} - V\_350$) and a drain-source voltage $V_{DS1}$ (e.g., $V_{DS1} = V_{SET} - V\_350$), where V_350 is a voltage at the common node 350 (also referred to herein as the first node) between the transistor 322 and the resistor 320.

More specifically, in one embodiment, if $V_{GS1}$ is greater than a transistor threshold $V_{TRAN}$ and $V_{DS1}$ is less than $V_{GS1}$ minus $V_{TRAN}$ (e.g., $V_{GS1} > V_{TRAN}$ and $V_{DS1} < V_{GS1} - V_{TRAN}$), the transistor 322 enters the linear region. In the linear region, the transistor 322 operates as a switch which is turned on to couple the reference voltage $V_{SET}$ to the node 350. If $V_{GS1}$ is greater than $V_{TRAN}$ and $V_{DS1}$ is greater than $V_{GS1}$ minus $V_{TRAN}$ (e.g., $V_{GS1} > V_{TRAN}$ and $V_{DS1} > V_{GS1} - V_{TRAN}$), the transistor 322 enters the saturation region. In the saturation region, the transistor 322 operates as an amplifier to determine the current flowing through the transistor 322, e.g., I1, according to the gate-source voltage $V_{GS1}$. For example, the current I1 can be a substantially constant current if $V_{GS1}$ has a substantially constant value. If $V_{GS1}$ is less than $V_{TRAN}$, e.g., $V_{GS1} < V_{TRAN}$, the transistor 322 enters the off region, in which the transistor 322 operates as a switch which is turned off to disable the current path L1. In conclusion, the transistor 322 is conductive in both the linear region and the saturation region.

The transistor 324 is coupled to a node that is at the slew voltage $V_{SLEW}$, and has a gate coupled to an output terminal of the Op-amp 306. Similar to the transistor 322, the transistor 324 is capable of working in a linear region, an off region, or a saturation region in accordance with a gate-source voltage $V_{GS2}$ (e.g., $V_{GS2} = V_{GATE2} - V\_352$) and a drain-source voltage $V_{DS2}$ (e.g., $V_{DS2} = V_{SLEW} - V\_352$), where V_352 is a voltage at the common node 352 (also referred to herein as the second node) between the transistor 324 and the resistor 320.

The resistor 320 is coupled between the node 350 and the node 352 and is used to determine the current I1 or I2. By way of example, when the current path L1 is conducted, e.g., the transistors 322 and 324 operate in either the linear region or the saturation region, I1 or I2 can be a substantially constant current if a voltage across the resistor 320, e.g., V_350−V_352, is maintained to be substantially constant. Moreover, if V_350 is greater than V_352, the current I1 is generated to flow from the current generator 302 to the capacitor 326. If V_350 is less than V_352, the current I2 is generated to flow from the capacitor 326 to the current generator 302.

The control circuit 305 controls the current I1 or I2 through the current path L1 by controlling the gate voltages $V_{GATE1}$ and $V_{GATE2}$ and by controlling the node voltages V_350 and V_352. The Op-amp 304 has a non-inverting input terminal coupled to the node 352 through the voltage source 308, an inverting input terminal coupled to the node 350, and an output terminal coupled to the gate of the transistor 322. The Op-amp 306 has a non-inverting input terminal coupled to the node 350 through the voltage source 310, an inverting input terminal coupled to the node 352, and an output terminal coupled to the gate of the transistor 324.

In one embodiment, the voltage source 308 generates a fixed reference voltage $V_{OS1}$. As such, a difference between a voltage V+ at the non-inverting input terminal and a voltage V− at the inverting input terminal of the Op-amp 304 is obtained according to equation (2):

$$V+ - V- = V\_352 + V_{OS1} - V\_350. \quad (2)$$

Likewise, the voltage source 310 can also generate a fixed reference voltage $V_{OS2}$. Thus, a difference between a voltage V+' at the non-inverting input terminal and a voltage V−' at the inverting input terminal of the Op-amp 306 is obtained according to equation (3):

$$V+'-V-'=V\_350+V_{OS2}-V\_352. \qquad (3)$$

In one embodiment, $V_{OS1}$ is equal to $V_{OS2}$.

The Op-amp 304 is operable for amplifying a difference between the voltage V+ and the voltage V− to provide an output voltage $V_{GATE1}$ at the output terminal of the Op-amp 304, which can be given by:

$$V_{GATE1}=(V+-V-)*A1=(V\_352+V_{OS1}-V\_350)*A1, \qquad (4)$$

where A1 represents a gain of the Op-amp 304. The gain A1 can have a relatively large value, e.g., A1 is greater than a million. Moreover, the transistor 322, coupled between the inverting input terminal and the output terminal of the Op-amp 304, operates as a negative feedback circuit for the Op-amp 304. That is, the Op-amp 304 and the transistor 322 constitute a negative feedback loop.

More specifically, in one embodiment, if V+ is greater than V−, then the relatively large gain A1 causes the Op-amp 304 to pull up the output voltage $V_{GATE1}$ to a maximum level $V_{MAX}$ according to equation (4). For example, if the power supply for the ramp circuit 236 is 5 volts, then $V_{MAX}$ is approximately equal to 5 volts. If V+ is equal to V−, then $V_{GATE1}$ is equal to substantially zero volts according to equation (4). However, since the gain A1 is relatively large, the Op-amp 304 has a virtual short property to keep the voltage V+ approximately equal to the voltage V− when $V_{GATE1}$ varies in a predetermined virtual-short range. If the voltage V+ is less than the voltage V−, the Op-amp 304 decreases the output voltage $V_{GATE1}$ to a minimum level $V_{MIN}$.

The Op-amp 306 is operable for amplifying a difference between the voltage V+' and the voltage V−' to provide an output voltage $V_{GATE2}$ at the output terminal of the Op-amp 306, which can be given by:

$$V_{GATE2}=(V+'-V-')*A2=(V\_350+V_{OS2}-V\_352)*A2, \qquad (5)$$

where A2 represents a gain of the Op-amp 306. Moreover, the transistor 324, coupled between the inverting input terminal and the output terminal of the Op-amp 306, operates as a negative feedback circuit for the Op-amp 306. The Op-amp 306 determines the output voltage $V_{GATE2}$ according to the voltage V+' and the voltage V−', which is similar to the operation of the Op-amp 304. The operation of the current generator 302 is further described in relation to FIG. 4. The current generator 302 can have other configurations, and is not limited to the example of FIG. 4.

The detection module 330 is coupled to the current generator 302 and is operable for detecting the reference voltage $V_{SET}$ and the slew voltage $V_{SLEW}$, and for generating the detection signal 240 indicating whether the slew voltage $V_{SLEW}$ is ramping up/down after the reference voltage $V_{SET}$ is set accordingly. In one embodiment, the detection module 330 includes a pair of comparators 311 and 312, and an OR gate 314.

The detection module 330 detects the reference voltage $V_{SET}$ and the slew voltage $V_{SLEW}$ by detecting the gate voltages $V_{GATE1}$ and $V_{GATE2}$. In one embodiment, the comparator 311 has an inverting input terminal for receiving the voltage $V_{GATE1}$ at the output terminal of the Op-amp 304, and has a non-inverting input terminal for receiving a threshold voltage $V_{TH}$. Additionally, the comparator 312 has an inverting input terminal for receiving the voltage $V_{GATE2}$ at the output terminal of the Op-amp 306, and has a non-inverting input terminal for receiving the threshold voltage $V_{TH}$. The comparator 311 compares the voltage $V_{GATE1}$ to the threshold voltage $V_{TH}$, and generates an output voltage V_311 accordingly. In the embodiment of FIG. 3, the output voltage V_311 is digital zero if $V_{GATE1}$ is greater than $V_{TH}$, and is digital one if $V_{GATE1}$ is less than $V_{TH}$. Similarly, the output voltage V_312 generated by the comparator 312 is digital zero if $V_{GATE2}$ is greater than $V_{TH}$, and is digital one if $V_{GATE2}$ is less than $V_{TH}$.

The OR gate 314 receives the voltage V_312 and the voltage V_311 to generate the detection signal 240. More specifically, in one embodiment, the detection signal 240 is digital one if at least one of the voltage V_312 and the voltage V_311 is digital one, e.g., when at least one of the voltage $V_{GATE1}$ and the voltage $V_{GATE2}$ is lower than the threshold voltage $V_{TH}$. The detection signal 240 is digital zero if both the voltage V_312 and the voltage V_311 are digital zero, e.g., when both the voltage $V_{GATE1}$ and the voltage $V_{GATE2}$ are greater than the threshold voltage $V_{TH}$. The operation of the detection module 330 is further described in relation to FIG. 4. The detection module 330 can have other configurations, and is not limited to the example of FIG. 3.

Figure 4:
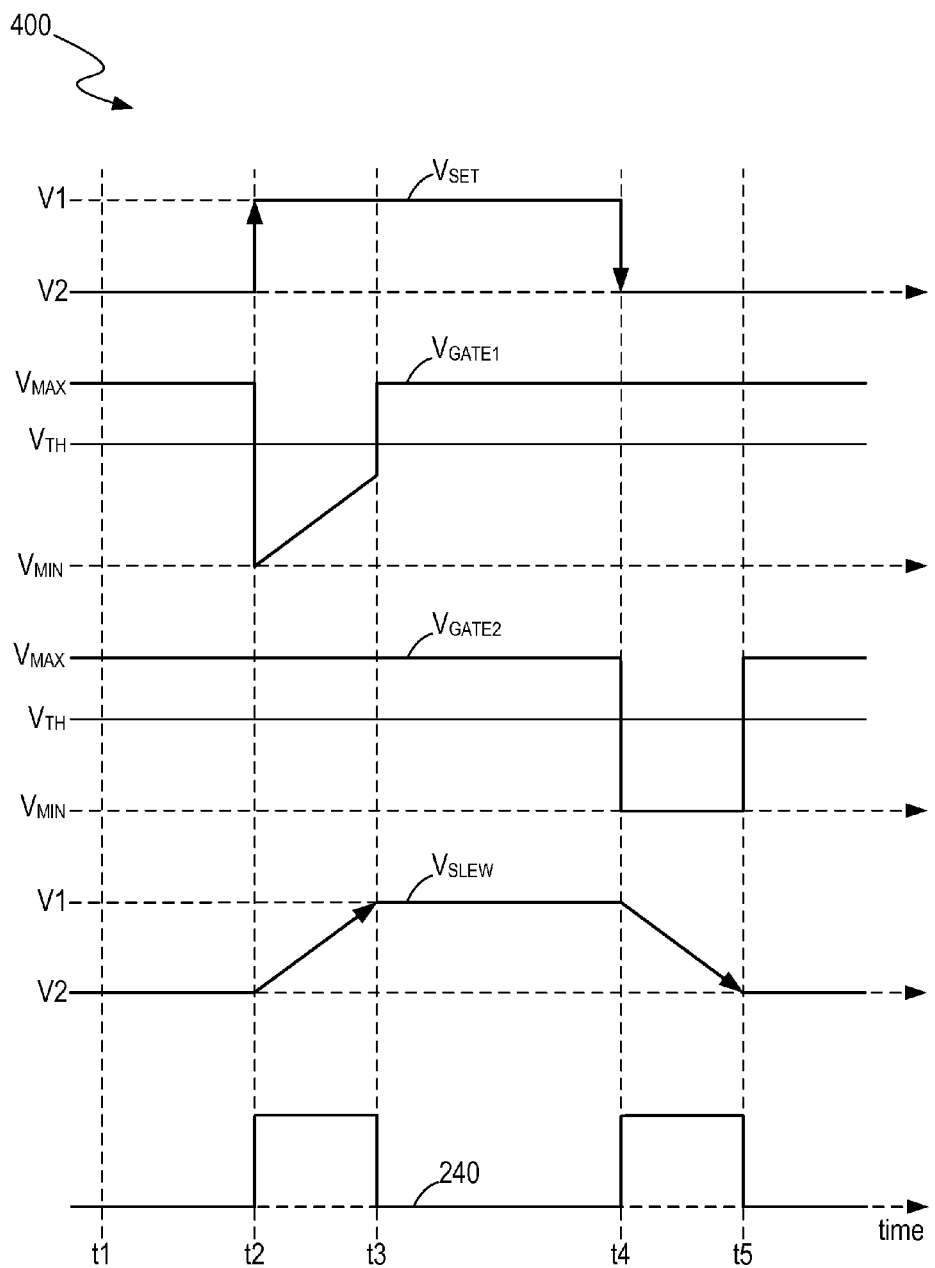
FIG. 4 illustrates a timing diagram of signals received and generated by a ramp circuit, in accordance with one embodiment of the present invention.

FIG. 4 illustrates a timing diagram 400 of signals received and generated by the ramp circuit 236, in accordance with one embodiment of the present invention. FIG. 4 is described in combination with FIG. 2 and FIG. 3. In the example of FIG. 4, the timing diagram 400 shows the reference voltage $V_{SET}$, the voltage $V_{GATE1}$ at the output terminal of the Op-amp 304, the voltage $V_{GATE2}$ at the output terminal of the Op-amp 306, the slew voltage $V_{SLEW}$, and the detection signal 240.

At time t1, both the reference voltage $V_{SET}$ and the slew voltage $V_{SLEW}$ are equal to the level V2. Thus, no current flows through the current path L1 including the transistor 322, the resistor 320, and the transistor 324. The voltage V_350 at the node 350 is equal to the voltage V_352 at the node 352. According to equation (2), the voltage V+ is equal to the voltage V− plus the reference voltage $V_{OS1}$, e.g., V+=V−+$V_{OS1}$, which means V+ is greater than V−. Thus, the Op-amp 304 increases the voltage $V_{GATE1}$ to the maximum level $V_{MAX}$. Since $V_{MAX}$ is approximately equal to the supply voltage (e.g., 5 volts), the gate-source voltage $V_{GS1}$ is greater than the transistor threshold $V_{TRAN}$ and the source-drain voltage $V_{DS1}$ is less than $V_{GS1}$ subtracted by $V_{TRAN}$. As such, the transistor 322 enters the linear region. During the time interval of t1 to t2, the transistor 322 operates as a switch that is switched on to couple the reference voltage $V_{SET}$ to the node 350. Similarly, the transistor 324 also operates as a switch which is turned on to couple the slew voltage $V_{SLEW}$ to the node 352.

As shown in FIG. 4, both the voltage $V_{GATE1}$ and the voltage $V_{GATE2}$ are greater than the threshold voltage $V_{TH}$. Therefore, the detection signal 240 is digital zero during the time interval from t1 to t2.

At time t2, the reference voltage $V_{SET}$ steps up from the level V2 to the level V1 for setting the output voltage $V_{OUT}$ from V2 to V1. When the reference voltage $V_{SET}$ is initially changed, both the transistor 322 and the transistor 324 operate as a switch (which is turned on). As such, the voltage V_350 is equal to V1, and the voltage V_352 is equal to V2.

Assuming that a difference between V1 and V2 is greater than $V_{OS1}$, the voltage V+ becomes less than the voltage V− based on equation (2). Therefore, the Op-amp 304 decreases the voltage $V_{GATE1}$ to the minimum level $V_{MIN}$. If the gate-source voltage $V_{GS1}$ drops below the transistor threshold $V_{TRAN}$ at time t2, the transistor 322 enters the off region to disable the current path L1. In this circumstance, the voltage V_350 becomes equal to V_352, and the Op-amp 304 increases the voltage $V_{GATE1}$, which is similar as the operation during t1 to t2. In other words, the variation of $V_{SET}$ causes $V_{GATE1}$ to be decreased, which may further enable the negative feedback loop including the transistor 322 and the Op-amp 304 to increase $V_{GATE1}$. As such, at time t2, the negative feedback loop can enter a balance state, in which the transistor 322 is conductive in the saturation region instead of the off region. Alternatively, the minimum level $V_{MIN}$ of $V_{GATE1}$ does not necessarily enable the transistor 322 to enter the off region. For example, $V_{MIN}$ can be greater than V_350, thereby enabling $V_{GS1}$ to be greater than the transistor threshold $V_{TRAN}$. At the same time, $V_{MIN}$ is less than $V_{SET}$, thereby enabling $V_{GS1}$ to be less than $V_{DS1}$. As such, the transistor 322 enters the saturation region. In both circumstances, the voltage V_350 at the node 350 is no longer equal to $V_{SET}$ when the transistor 322 operates in the saturation region. Thus, the Op-amp 304 can adjust V− according to $V_{GATE1}$ at the output terminal of the Op-amp 304, e.g., the Op-amp 304 keeps V+ approximately equal to V− if $V_{GATE1}$ is within the predetermined virtual-short range.

At time t2, the voltage V+' remains greater than the voltage V−' according to equation (3). As such, the voltage $V_{GATE2}$ is equal to $V_{MAX}$, and the transistor 324 operates in the linear region to couple the slew voltage $V_{SLEW}$ to the node 352.

During the time interval from t2 to t3, the negative feedback loop including the Op-amp 304 and the transistor 322 enable $V_{GATE1}$ to change within a virtual short range. Thus, the Op-amp 304 keeps the voltage V+ approximately equal to the voltage V−. As such, a difference between V_350 and V_352 is equal to $V_{OS1}$ according to equation (2). As both the transistor 322 (in the saturation region) and the transistor 324 (in the linear range) are conductive, the current I1 is generated through the transistor 322, the resistor 320, and the transistor 324, and can be given by:

$$I1=(V\_350-V\_352)/R=V_{OS1}/R. \quad (6)$$

As shown in equation (6), the current I1 is a substantially constant current that flows from the current generator 302 to the capacitor 326 to charge the capacitor 326. Therefore, the slew voltage $V_{SLEW}$ ramps up at a substantially constant slew rate during the time interval from t2 to t3, where the slew rate is determined by I1.

Additionally, the voltage V_352 is equal to the slew voltage $V_{SLEW}$ during the time interval from t2 to t3. Because a difference between V_350 and V_352 is equal to the fixed reference voltage $V_{OS1}$, the voltage V_350 increases as the voltage $V_{SLEW}$ increases. Moreover, since I1 is a substantially constant current and the transistor 322 operates in the saturation region to determine I1 according to $V_{GS1}$, $V_{GS1}$ remains substantially constant. As such, $V_{GATE1}$ varies according to the slew voltage $V_{SLEW}$. For example, $V_{GATE1}$ follows the slew voltage $V_{SLEW}$ to ramp up at a substantially constant rate during the time interval from t2 to t3.

As shown in FIG. 4, $V_{GATE1}$ is less than $V_{TH}$ while $V_{GATE2}$ is greater than $V_{TH}$. Therefore, the detection signal 240 at the output of the OR gate 314 is digital one during the time interval from t2 to t3 when the slew voltage $V_{SLEW}$ ramps up from V2 to V1.

At time t3, the slew voltage $V_{SLEW}$ reaches V1, that is, $V_{SLEW}$=V_352=V_350=$V_{SET}$. Then, the current I1 drops to zero amperes. The Op-amp 304 operates to pull up the voltage $V_{GATE1}$ to the maximum level $V_{MAX}$, e.g., $V_{MAX}$ is equal to the supply voltage. Consequently, both $V_{GATE1}$ and $V_{GATE2}$ are greater than $V_{TH}$. Accordingly, the detection signal 240 is digital zero during the time period from t3 to t4.

At time t4, the reference voltage $V_{SET}$ steps down from the level V1 to the level V2 to change the output voltage $V_{OUT}$ from V1 to V2. Similar to the operation of the current generator 302 at time t2, the voltage $V_{GATE2}$ drops to the level $V_{MIN}$. The transistor 324 operates in a saturation region, in which the transistor 324 determines the current I2 according to the gate-source voltage $V_{GS2}$. The Op-amp 306 maintains the voltage V+' approximately equal to the voltage V−'. The Op-amp 304 pulls up the voltage $V_{GATE1}$ to $V_{MAX}$. The transistor 322 operates in the linear region to couple $V_{SET}$ to the node 350.

During the time interval from t4 to t5, the Op-amp 306 and the transistor 324 constitute a negative feedback loop. As such, the difference between V_352 and V_350 is equal to $V_{OS2}$ according to equation (3). As a result, the current I2 is generated through the transistor 324, the resistor 320, and the transistor 322, which can be given by:

$$I2=(V\_350-V\_352)/R=-V_{OS2}/R. \quad (7)$$

As shown in equation (7), the current I2 is also a substantially constant current that flows from the capacitor 326 to the current generator 302, which discharges the capacitor 326. Therefore, the slew voltage $V_{SLEW}$ ramps down at a substantially constant rate, where the rate is determined by I2.

In one embodiment, when the slew voltage $V_{SLEW}$ ramps down during t4 to t5, both the voltage V_350 (equal to $V_{SET}$) and the voltage V_352 (equal to $V_{SET}+V_{OS2}$) do not change. As such, the voltage $V_{GATE2}$ remains equal to the level $V_{MIN}$ as $V_{GS2}$ is a substantially constant voltage. As shown in FIG. 4, the voltage $V_{GATE1}$ is greater than $V_{TH}$ while the voltage $V_{GATE2}$ is less than $V_{TH}$. Therefore, the detection signal 240 is digital one during the time interval from t4 to t5 when $V_{SLEW}$ ramps down from V1 to V2.

Advantageously, if the reference voltage $V_{SET}$ is set to V1 at time t2, the output voltage $V_{OUT}$ follows $V_{SLEW}$ to linearly increase from V2 to V1 during the time interval of t2 to t3. Likewise, if the reference voltage $V_{SET}$ is set to V2 at time t4, the output voltage $V_{OUT}$ follows $V_{SLEW}$ to linearly decrease from V1 to V2 during the time interval of t4 to t5. As such, the current flowing through the capacitor 228 and the inductor 226 is maintained in a safe range, which improves the performance of converter circuit 200 and lengthens the lifetime of converter circuit 200.

In one embodiment, the detection signal 240 is digital one during t2 to t3 when the slew voltage $V_{SLEW}$ ramps up and during t4 to t5 when the slew voltage $V_{SLEW}$ ramps down. Advantageously, the protection component 234 can be temporarily disabled during t2 to t3 and t4 to t5 according to the detection signal 240. In this way, operation of the converter 220 is not terminated by setting the reference voltage $V_{SET}$, thereby improving the stability of the converter circuit 200.

Figure 5:
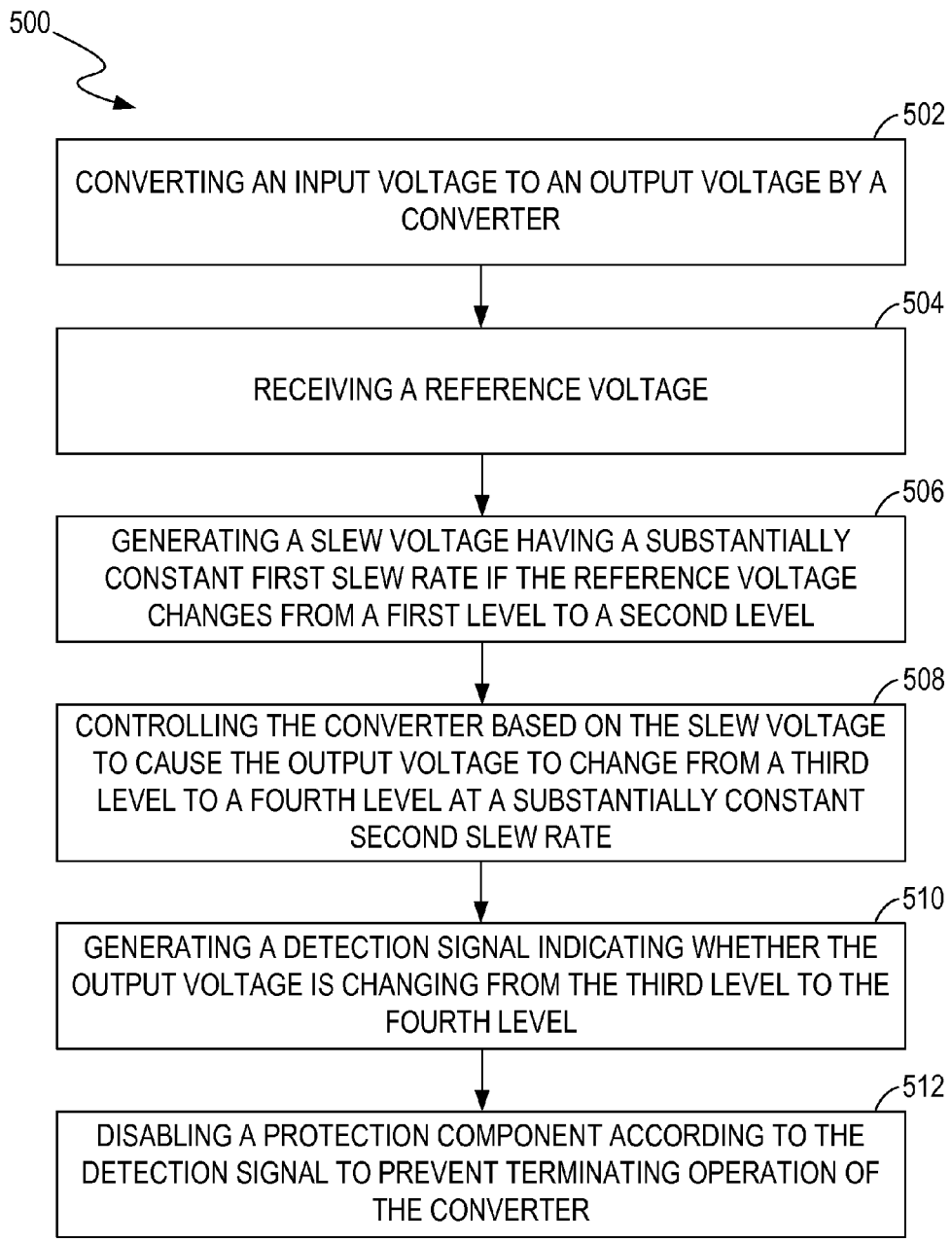
FIG. 5 illustrates a flowchart of operations performed by a converter circuit, in accordance with one embodiment of the present invention.

FIG. 5 illustrates a flowchart 500 of operations performed by a converter circuit, e.g., the converter circuit 200, in accordance with one embodiment of the present invention. FIG. 5 is described in combination with FIG. 2-FIG. 4. Although specific steps are disclosed in FIG. 5, such steps are examples. That is, the present invention is well suited to performing various other steps or variations of the steps recited in FIG. 5.

In block 502, an input voltage, e.g., $V_{IN}$, is converted to an output voltage, e.g., $V_{OUT}$, by a converter, e.g., the converter 220. In block 504, a reference voltage, e.g., $V_{SET}$, is received.

In block 506, a slew voltage, e.g., $V_{SLEW}$, having a substantially constant first slew rate is generated if the reference voltage changes from a first level, e.g., $V_{SET1}$, to a second level, e.g., $V_{SET2}$. In block 508, the converter is controlled based on the slew voltage to change the output voltage from a third level, e.g., $V_{DESIRE1}$, to a fourth level, e.g., $V_{DESIRE2}$, at a substantially constant second slew rate. In one embodiment, a feedback signal indicating the output voltage is received. The output voltage is adjusted based on a comparison of the feedback signal and the slew voltage. In one embodiment, a constant current through a current path, e.g., the current path L, is generated if the reference voltage changes from the first level to the second level. The constant current is conducted through a capacitor to generate the slew voltage. In one embodiment, the current path includes a first transistor, e.g., the transistor 322, a resistor, e.g., the resistor 320, and a second transistor, e.g., the transistor 324, coupled in series.

In block 510, a detection signal, e.g., the detection signal 240, indicating whether the slew voltage is changing from the third level to the fourth level, is generated. In block 512, a protection component, e.g., the protection component 234, is prevented from terminating operation of the converter according to the detection signal. In one embodiment, the detection signal is generated according to gate voltages of the first and second transistors, e.g., $V_{GATE1}$ and $V_{GATE2}$.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A converter circuit comprising:
    a converter operable for converting an input voltage to an output voltage; and
    a controller coupled to said converter and operable for receiving a reference voltage at a first terminal, generating a slew voltage at a second terminal, controlling a current flowing through said first and second terminals to change said slew voltage at a substantially constant first slew rate if said reference voltage changes from a first level to a second level, and controlling said converter based on said slew voltage to cause said output voltage to change from a third level to a fourth level at a second slew rate, wherein said controller comprises:
        a resistor coupled between a first node and a second node;
        a first transistor coupled between said first node and said first terminal;
        a second transistor coupled between said second node and said second terminal; and
        a control circuit operable for controlling said current to flow through said resistor and said first and second transistors by controlling node voltages on said first node and said second node, and by controlling gate voltages of said first transistor and said second transistor, and wherein said controller adjusts said slew voltage according to said current.

2. The converter circuit as claimed in claim 1, wherein said first slew rate is proportional to said second slew rate, said first level is proportional to said third level, and said second level is proportional to said fourth level.

3. The converter circuit as claimed in claim 1, wherein said controller comprises:
    a regulator operable for receiving a feedback signal indicating said output voltage and also operable for generating a control signal to adjust said output voltage based on a comparison of said feedback signal and said slew voltage.

4. The converter circuit as claimed in claim 1, wherein said controller further comprises:
    a protection component operable for generating a termination signal to terminate operation of said converter; and
    a ramp circuit coupled to said protection component and operable for generating a detection signal indicating whether said output voltage is changing from said third level to said fourth level,
    wherein said protection component is prevented from terminating operation of said converter if said detection signal indicates that said output voltage is changing from said third level to said fourth level.

5. The converter circuit as claimed in claim 1, wherein said controller further comprises:
    a current generator operable for generating said current, controlling said current to be substantially constant, and conducting said current through a capacitor to generate said slew voltage.

6. The converter circuit as claimed in claim 1, wherein said gate voltages control said first transistor to transfer said reference voltage from said first terminal to said first node and control said second transistor to transfer said slew voltage from said second terminal to said second node when said reference voltage is equal to said slew voltage, and wherein no current flows through said resistor when said reference voltage is equal to said slew voltage.

7. The converter circuit as claimed in claim 1, wherein when said reference voltage changes from said first level to said second level, said controller changes said slew voltage toward said second level at said substantially constant first slew rate by maintaining a voltage across said resistor at a substantially constant voltage level.

8. The converter circuit as claimed in claim 1, wherein said first transistor comprises a first field-effect transistor, and said second transistor comprises a second field-effect transistor, and wherein if said reference voltage changes from said first level to said second level, then said gate voltages control one of said first and second field-effect transistors to operate in a saturation region and the other one of said first and second field-effect transistors to operate in a linear region.

9. The converter circuit as claimed in claim 1, wherein said controller further comprises:
    a detection module coupled to said first and second transistors and operable for detecting said gate voltages and also operable for generating a detection signal indicating whether said output voltage is changing from said third level to said fourth level according to said gate voltages.

10. The converter circuit as claimed in claim 1, wherein said control circuit comprises:
    a plurality of amplifiers operable for generating said gate voltages, said amplifiers comprising a first amplifier and a second amplifier, wherein a first input terminal of said first amplifier is coupled to said second node through a first constant voltage source such that a voltage difference between said first input terminal of said first amplifier and said second node is equal to a voltage of said first constant voltage source, wherein a second input terminal of said first amplifier is coupled to said first node to receive a node voltage at said first node, wherein a first input terminal of said second amplifier is coupled to said first node through a second constant voltage source such that a voltage difference between said first input terminal of said second amplifier and said first node is equal to a voltage of said second constant voltage source, and wherein a second input terminal of said second amplifier is coupled to said second node to receive a node voltage at said second node.

11. The converter circuit as claimed in claim 10, wherein said first transistor and said first amplifier constitute a negative feedback loop when the changing of said reference voltage from said first level to said second level causes said reference voltage to be greater than said slew voltage, and wherein said negative feedback loop maintains a voltage across said resistor at a substantially constant voltage level.

12. The converter circuit as claimed in claim 10, wherein said second transistor and said second amplifier constitute a negative feedback loop when the changing of said reference voltage from said first level to said second level causes said reference voltage to be less than said slew voltage, and wherein said negative feedback loop maintains a voltage across said resistor at a substantially constant voltage level.

13. A method for controlling a converter that converts an input voltage to an output voltage, said method comprising:
   receiving a reference voltage at a first terminal;
   generating a slew voltage at a second terminal;
   controlling a current flowing through said first and second terminals to change said slew voltage at a substantially constant first slew rate if said reference voltage changes from a first level to a second level, wherein said controlling of said current comprises:
      controlling said current to flow through a first transistor, a resistor, and a second transistor, wherein said resistor is coupled between a first node and a second node, said first transistor is coupled between said first terminal and said first node, and said second transistor is coupled between said second terminal and said second node;
      maintaining said current to be substantially constant by controlling node voltages on said first and second nodes and by controlling gate voltages of said first and second transistors; and
      conducting said current through a capacitor to generate said slew voltage; and
   controlling said converter based on said slew voltage to cause said output voltage to change from a third level to a fourth level at a second slew rate.

14. The method as claimed in claim 13, further comprising:
   receiving a feedback signal indicating said output voltage; and
   controlling said output voltage based on a comparison of said feedback signal with said slew voltage.

15. The method as claimed in claim 13, further comprising:
   generating a detection signal indicating whether said output voltage is changing from said third level to said fourth level; and
   disabling a protection component to prevent terminating operation of said converter if said detection signal indicates that said output voltage is changing from said third level to said fourth level.

16. The method as claimed in claim 13, further comprising:
   detecting said gate voltages of said first and second transistors; and
   generating a detection signal indicating whether said output voltage is changing from said third level to said fourth level according to said gate voltages.

17. The method as claimed in claim 13, wherein said controlling of said current comprises:
   controlling a voltage difference between a first input terminal of a first amplifier and said second node to be equal to a voltage of a first constant voltage source;
   receiving, at a second input terminal of said first amplifier, a node voltage at said first node;
   generating, at an output terminal of said first amplifier, a gate voltage to control said first transistor;
   controlling a voltage difference between a first input terminal of a second amplifier and said first node to be equal to a voltage of a second constant voltage source;
   receiving, at a second input terminal of said second amplifier, a node voltage at said second node; and
   generating, at an output terminal of said second amplifier, a gate voltage to control said second transistor.

18. The method as claimed in claim 17, wherein a transistor of said first and second transistors and an amplifier of said first and second amplifiers constitute a negative feedback loop when said reference voltage changes from said first level to said second level, and wherein said method further comprises:
   maintaining a voltage across said resistor at a substantially constant voltage level, using said negative feedback loop.

19. A controller for a converter, said controller comprising:
   a resistor coupled between a first node and a second node;
   a first transistor coupled between said first node and a first terminal;
   a second transistor coupled between said second node and a second terminal;
   a signal generator operable for receiving a reference voltage at said first terminal, generating a slew voltage at said second terminal, controlling a current flowing through said first and second terminals to change said slew voltage at a substantially constant first slew rate if said reference voltage changes from a first level to a second level, and controlling said current to flow through said resistor and said first and second transistors by controlling node voltages on said first node and said second node, and by controlling gate voltages of said first transistor and said second transistor, wherein said controller adjusts said slew voltage according to said current; and
   a control circuit, coupled to said signal generator, operable for controlling said converter based on said slew voltage to cause an output voltage of said converter to change from a third level to a fourth level at a second slew rate.

20. The controller as claimed in claim 19, wherein said signal generator further comprises:
   a capacitor coupled to said second terminal,
   wherein said signal generator maintains said current to be substantially constant by controlling said node voltages and said gate voltages, and conducts said current through said capacitor to generate said slew voltage.

21. The controller as claimed in claim 19, wherein said signal generator comprises:
   a first amplifier comprising a first input terminal coupled to said second node through a first constant voltage source such that a voltage difference between said first input terminal of said first amplifier and said second node is equal to a voltage of said first constant voltage source, comprising a second input terminal operable for receiving a node voltage at said first node, and comprising an output terminal operable for generating a gate voltage to control said first transistor; and
   a second amplifier comprising a first input terminal coupled to said first node through a second constant voltage source such that a voltage difference between said first input terminal of said second amplifier and said first node is equal to a voltage of said second constant voltage source, comprising a second input terminal operable for receiving a node voltage at said second node, and comprising an output terminal operable for generating a gate voltage to control said second transistor.

22. The controller as claimed in claim 19, wherein a transistor of said first and second transistors and an amplifier of said first and second amplifiers constitute a negative feedback loop when said reference voltage changes from said first level to said second level, and wherein said negative feedback loop maintains a voltage across said resistor at a substantially constant voltage level.

\* \* \* \* \*